Patented Feb. 20, 1934

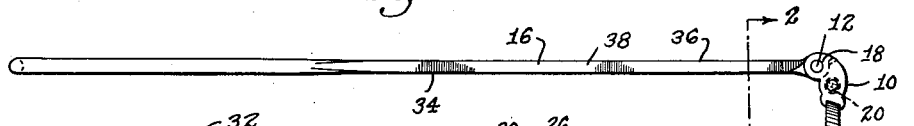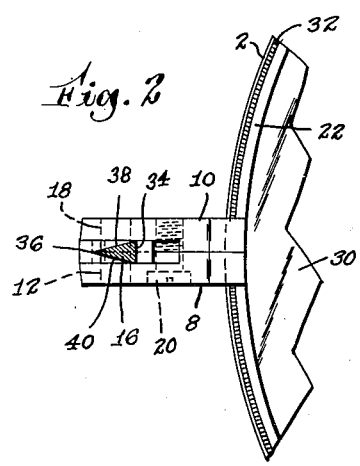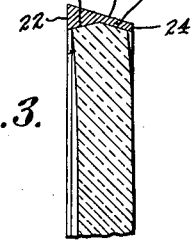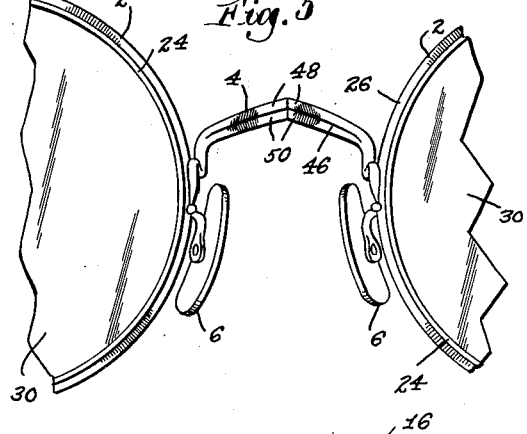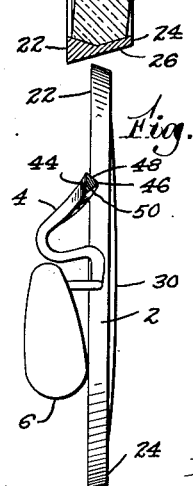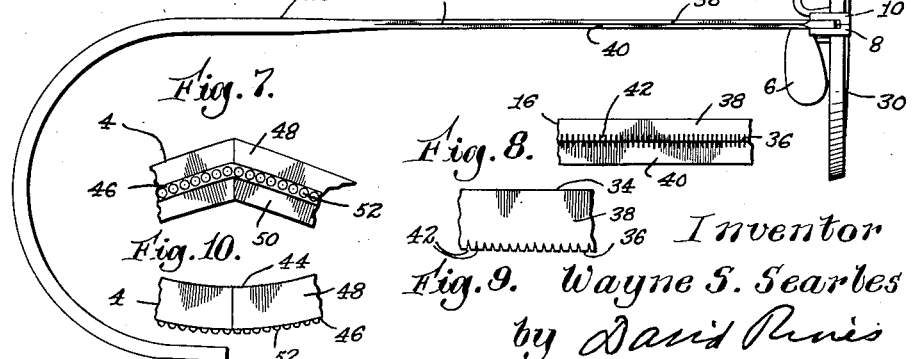

1,947,882

UNITED STATES PATENT OFFICE 1,947,882

OPHTHALMIC MOUNTING

Wayne S. Searles, Providence, R. I., assignor to Universal Optical Corporation, Providence, R. I., a corporation of Rhode Island Application October 10, 1932. Serial No. 637,066

6 Claims. (Cl. 88—47)

The present invention relates to ophthalmic mountings.

Ophthalmic mountings of the so-called "rimless" type are very popular because, having no lens-holding rims, whether of metal or other material, they are less conspicuous, and thus do not so loudly proclaim that their owner is wearing glasses. A chief objection to their wider use, however, lies in the fact that, being unprotected by the lens-holding rims, they become so easily broken.

An object of the invention, therefore, is to improve upon ophthalmic mountings of the above-described character.

A further object is to provide a lens-holding rim that shall be relatively inconspicuous,—almost, if not quite, as inconspicuous, in fact, as the rimless lenses themselves.

A further object is to increase the effect of this inconspicuousness.

One of the reasons that so many persons prefer mountings of the finger-piece and similar types is that they are unprovided with temples, which themselves are conspicuous, and a further object is to provide a relatively inconspicuous temple.

Still another object is to provide a relatively inconspicuous bridge or center bar for ophthalmic mountings.

Other and further objects will be explained hereinafter, and will be particularly pointed out in the appended claims.

The invention will now be explained in connection with the accompanying drawing, in which Fig. 1 is a plan of a pair of spectacles embodying the present invention; Figs. 2, 3 and 4 are enlarged sections taken, respectively, upon the lines 2—2, 3—3 and 4—4 of Fig. 1, looking in the directions of the arrows; Fig. 5 is an enlarged, fragmentary, front elevation of the same; Fig. 6 is an elevation; Fig. 7 is a still further enlarged, fragmentary, front elevation of the central portion of a preferred bridge or center bar; Fig. 8 is a corresponding enlarged, fragmentary end elevation of the temple; and Figs. 9 and 10 are fragmentary plans of the preferred temple and bridge corresponding to Figs. 8 and 7, respectively.

The illustrated ophthalmic mounting comprises a pair of spectacles with two lens-holding rims 2 connected together by a bridge or center bar 4, which may be of the type (not shown) that is adapted to rest directly on the wearer's nose, but that is illustrated as of the type that is adapted to be raised out of contact with the nose, rocking guards 6 being provided at each end of and below the bridge 4, to engage against the sides of the nose. The rims 2 are split at points opposite to the bridge 4, and each rim is provided at its ends with a pair of end pieces 8 and 10, between which is disposed a temple 16. The temple 16 is adapted to pivot about a cylindrical dowel 12 that is permanently fixed, usually upon the lower end piece 8 of each pair of end pieces and that extends through a correspondingly shaped opening (not shown) at the forward end of the temple 16, and into an opening 18 in the upper end piece 10. The end pieces 8 and 10 may be secured together, with the temple in place between them, by a screw 20.

Each rim 2 has an inner face 22, adapted to be positioned adjacent to the face of a wearer, an outer face 24 that is adapted to be positioned more remotely from the wearer, a face 26 continuously joining the inner and outer faces 22 and 24, and a face 28 between the inner and outer faces 22 and 24 disposed oppositely to the face 28, and constituting a groove for receiving a lens 30. As heretofore constructed, the inner and outer faces 22 and 24 have been of substantial thickness, in order to impart strength to the rim; but the thick outer face 24 has been objectionable to many wearers, who have, therefore, preferred the rimless type of mounting, without any rim at all.

According to the present invention, therefore, the outer face 24 is relatively very thin, as illustrated more particularly in Fig. 3, in order to produce the effect of inconspicuousness. The thinness is of so marked a degree, in fact, that, in practice, it is hardly observable at all, except upon a very close view. If the rim were of the same thinness throughout, indeed, it would be too weak to be relied upon for holding the lens 30 in place. The inner face 22, therefore, is relatively of substantial thickness, to provide strength. The relative thickness and thinness of the inner and outer faces 22 and 24 is illustrated more particularly in Fig. 3.

A person addressing the wearer of an opthalmic mounting embodying a rim 2 of this character can not see the relatively thick, inner face 22. He sees only the relatively thin outer face 24 which, as before stated, is so thin as to be inconspicuous. He will, of course, see also the face 26 joining the inner and outer faces 22 and 24 and which, because of the different thicknesses of the inner faces 22 and 24, will naturally slope away from the observer, or from right to left, as viewed in Fig. 3. By having the width of the rim 2, between the inner and outer faces 22 and 24, much greater than the thickness of the inner face 22, as is also clearly illustrated in Fig. 3, the joining face 26, which may be a straight line, in cross-section, as is likewise illustrated in Fig. 3, will be caused to slope or taper away very gradually from the outer face 24 to the inner face 22; thus enhancing the inconspicuousness and minimizing the effect that the thickness of the relatively thick, inner face 22 would otherwise produce. If the rim is made of metal, the metallic reflection of this gradually sloping face 28 will produce in the observer's mind the same effect that is produced by reflection from the edge of a rimless lens. This reflection from the sloping face 28 thus enhances, with the inconspicuousness of the outer face 24, the feeling on the part of the observer that his friend is wearing a rimless lens. In order to satisfy the curious that the lens 30 is, indeed, enclosed in a rim 2, it is sometimes necessary to take the spectacles off the wearer's face, and to expose the thick inner face 22 to view. To enhance the effect of the thickness of this inner face 22, it is found advisable to ornament it, as by providing it with beading, as illustrated more particularly at 32 in Fig. 2. This beading 32 may, of course, be omitted.

Rimless opthalmic mountings are ordinarily of two main types,—the type that is provided with temples, and the type that is held on the face without temples. In the latter type, the guards 6 are spring-pressed against the sides of the nose with considerable pressure. According to a further feature of the present invention, therefore, the spectacle temples 16 are also endowed with the quality of inconspicuousness.

Each temple 16 is provided with an inner face 34, adapted to be positioned adjacent to the side of the wearer's face, an outer face 36 adapted to be positioned more remotely from the said side of the wearer's face, and two oppositely disposed plane faces 38 and 40 continuously joining the inner and outer faces 34 and 36, and symmetrically disposed with respect to the inner and outer faces 34 and 36. The outer face 36 is relatively thin to produce the effect of inconspicuousness. It is shown in cross section in Fig. 2 as the vertex of an isosceles triangle of which the face 34,— relatively thick to provide strength,—is the base in cross section, and of which the straight-line cross sections of the plane faces 38 and 40 are the equal sides. In practice, however, this vertex can not be an exact point, but must have some thickness. As in the case of the rims 2, the width of the temple 16, between the inner and outer faces 34 and 36, is much greater than the thickness of the inner face 34, and for a similar purpose,—in order that the sides 38 and 40 shall slope or taper very gradually from the outer face 34 toward the inner face 36, and thus to enhance the effect of inconspicuousness. If the temple is made of metal, these sloping sides 38 and 40 will reflect light, which would have a tendency to invite attention to the fact that the temple does have a thickness. To distract the attention from this fact, therefore, and thus to enhance the effect of inconspicuousness, the thin face 36 of the temple is ornamented, as by means of fine beading 42, shown exaggerated in Figs. 8 and 9. The observer's eye being thus held by the beading 42, his mind does not dwell upon the faces 38 and 40. The width of the beading 42 may be substantially the same as the thickness of the thin outer face 36, or it may be somewhat wider.

The desirability has been explained of rendering the rims 4, and sometimes, also, the temples 16, inconspicuous. There is not the same necessity for rendering the bridge or center bar 4 inconspicuous, because it has always been of substantial thickness in all types of mountings. This has been accepted as a necessary evil, because a bridge or center bar must be employed in all mountings, and it must be strong enough to hold the lenses together. It is possible, according to the present invention, however, to decrease the conspicuousness of the bridge or center bar 4 also.

The theme is similar to what has already been described in connection with the rims 2 and the temples 16. The bridge has an inner face 44 that is adapted to be positioned adjacent to a wearer, an outer face 46 adapted to be positioned more remotely from the wearer, and two oppositely disposed faces 48 and 50 joining the inner and outer faces 44 and 46. The outer face 46 is relatively very thin, to produce the effect of inconspicuousness, the inner face 44 is relatively of substantial thickness to provide strength, and the joining faces 48 and 50 are straight lines in cross section and are symmetrically disposed with respect to the inner and outer faces 44 and 46, so that the joining faces 48 and 50 taper from the outer face 46 toward the inner face 44. The construction is similar to that of the temples 16, but the inner face 44 of the bridge 4 is relatively thicker than the inner face 34 of the temples 16, because greater rigidity is required in the bridge 4 than in the temples 16. The width of the bridge 4, between the inner and outer faces 44 and 46, may, however, be much greater than the thickness of the inner face 44, so that the faces 48 and 50 may slope or taper very gradually from the outer face 46 toward the inner face 44 to enhance the effect of inconspicuousness. Beading or other ornamentation 52 may be provided along the outer face 46, as is illustrated more particularly in Fig. 7, to enhance the effect of the thinness and, therefore, the inconspicuousness, of the outer face 46, particularly if the bridge 4 be made of metal. This beading 52, as in the case of the temple beading 42, may be of substantially the same width as the thickness of the thin outer face 46.

Modifications will obviously occur to persons skilled in the art, and all such are considered to fall within the spirit and scope of the invention, as defined in the appended claims.

What is claimed is:

1. An ophthalmic mounting comprising a plurality of members, namely, lens rims, a bridge and temples, each having an inner face adapted to be positioned adjacent to a wearer and being relatively thick to provide strength, and an outer face adapted to be positioned more remotely from the wearer and being relatively very thin to produce the effect of inconspicuousness, each lens rim having between its inner and outer faces a lens-receiving groove and a very gradually tapering face oppositely disposed to the lens-receiving groove, the bridge and the temples each having two positely disposed very gradually tapering faces joining their inner and outer faces, and the width of each member between its inner and outer faces being much greater than the thickness of the inner face of the corresponding member to enhance the effect of inconspicuousness.

2. A temple having an inner face adapted to be positioned adjacent to a wearer, an outer face adapted to be positioned more remotely from the wearer, and two oppositely disposed faces continuously joining the inner and outer faces, the outer face being relatively very thin to produce the effect of inconspicuousness, the inner face being relatively of substantialy thickness to provide strength, and the outer face being provided with fine beading to enhance the effect of inconspicuousness, the width of the beading being substantially the same as the thickness of the thin outer face.

3. A lens rim having an inner face adapted to be positioned adjacent to a wearer and being relatively thick to provide strength, and an outer face adapted to be positioned more remotely from the wearer and being relatively very thin to produce the effect of inconspicuousness, the lens rim having between its inner and outer faces a lens-receiving groove and a very gradually tapering face disposed oppositely to the lens-receiving groove, and the width of the rim between its inner and outer faces being much greater than the thickness of the inner face to enhance the effect of inconspicuousness.

4. A temple having an inner face adapted to be positioned adjacent to a wearer and being relatively thick to provide strength, an outer face adapted to be positioned more remotely from the wearer and being relatively very thin to produce the effect of inconspicuousness, and two oppositely disposed very gradually tapering faces joining the inner and outer faces, the width of the temple between the inner and outer faces being much greater than the thickness of the inner face to enhance the effect of inconspicuousness.

5. A bridge having an inner face adapted to be positioned adjacent to a wearer, an outer face adapted to be positioned more remotely from the wearer, and two oppositely disposed faces joining the inner and outer faces, the outer face being relatively thin and the inner face being relatively thick, the outer face being provided with beading to enhance the effect of the thinness of the outer face, and the width of the beading being substantially the same as the thickness of the thin outer face.

6. A bridge having a inner face adapted to be positioned adjacent to a wearer and being relatively thick to provide strength, an outer face adapted to be positioned more remotely from the wearer and being relatively very thin to produce the effect of inconspicuousness, and two oppositely disposed very gradually tapering faces joining the inner and outer faces, the width of the bridge between the inner and outer faces being much greater than the thickness of the inner face to enhance the effect of inconspicuousness.

WAYNE S. SEARLES.